Jan. 26, 1954
G. MEYER
2,667,252
CLAW CLUTCH
Filed Nov. 24, 1950
4 Sheets-Sheet 1
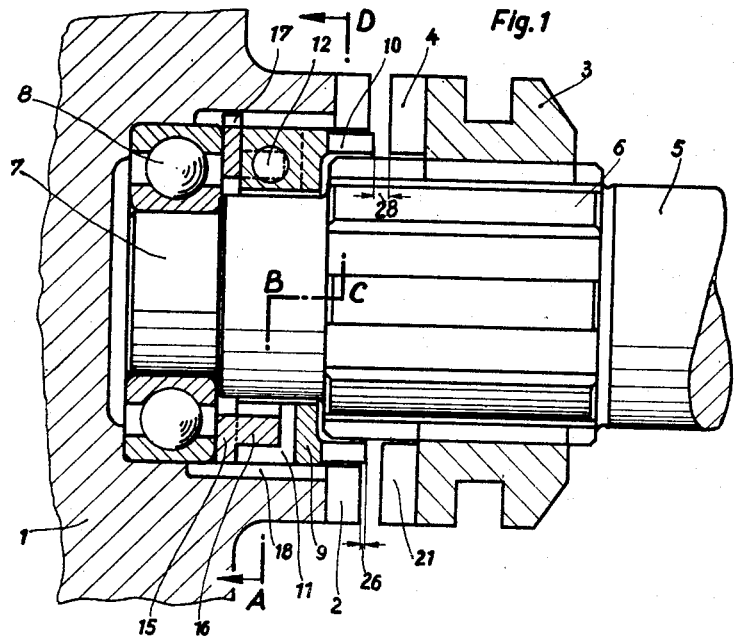
INVENTOR:
GUSTAV MEYER
BY K. B. Mayr
ATTORNEY.

Jan. 26, 1954   G. MEYER   2,667,252
CLAW CLUTCH
Filed Nov. 24, 1950   4 Sheets-Sheet 2

INVENTOR:
GUSTAV MEYER
BY K. B. Mayr
ATTORNEY.

Jan. 26, 1954  G. MEYER  2,667,252
CLAW CLUTCH

Filed Nov. 24, 1950  4 Sheets-Sheet 3

INVENTOR:
GUSTAV MEYER
BY K. B. Mayr
ATTORNEY

Jan. 26, 1954
G. MEYER
2,667,252
CLAW CLUTCH
Filed Nov. 24, 1950
4 Sheets-Sheet 4
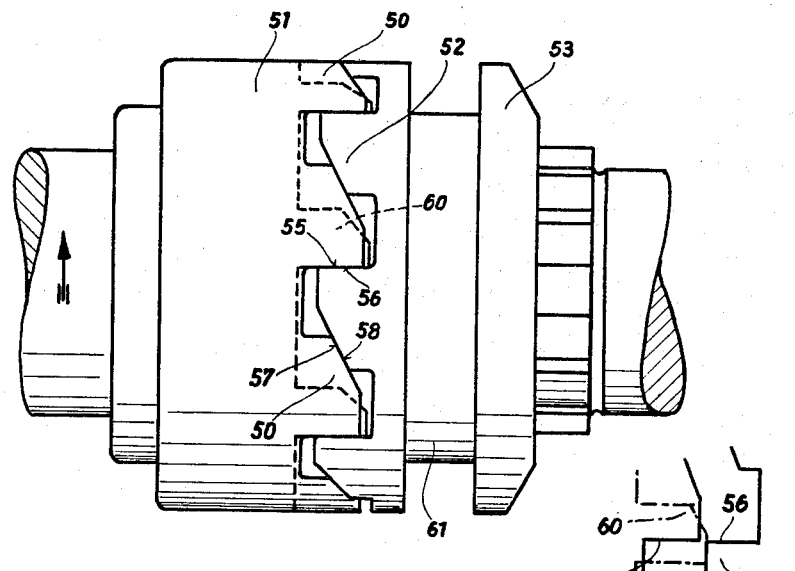
Fig. 12
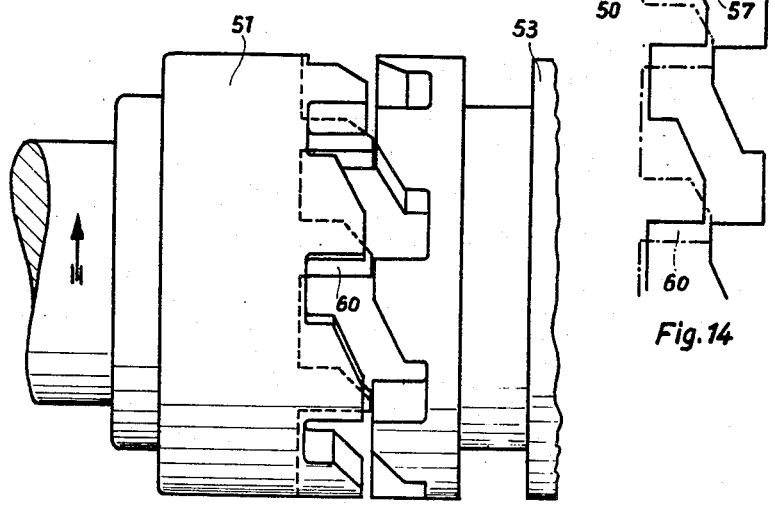
Fig. 13
Fig. 14
INVENTOR:
GUSTAV MEYER
BY K. B. Mayr
ATTORNEY.

Patented Jan. 26, 1954

2,667,252

UNITED STATES PATENT OFFICE 2,667,252

CLAW CLUTCH

Gustav Meyer, Wangen im Allgau, Wurttemberg, Germany, assignor to Karl Maybach, Friedrichshafen am Bodensee, Germany Application November 24, 1950, Serial No. 197,282

Claims priority, application Germany March 21, 1950

10 Claims. (Cl. 192—67)

The present invention relates to claw clutches, particularly for use in gear changing transmissions of motor vehicles.

It is an object of the present invention to provide an improved, reliable, simple, and inexpensive clutch of the type which can be engaged only when the speeds of the mating clutch halves are synchronized and which can be used for transmitting unusually great loads.

The invention refers to claw clutches of the type in which the axial faces of the claws have circumferentially inclined surface portions which cause rejection of the mating clutch halves as long as they rotate at different speeds and which promote engagement of the claws when one clutch part overtakes the mating clutch part. Such clutches are usually used in pairs in the gear changing transmissions of motor vehicles, the axially displaceable parts of two clutches being connected for simultaneous operation of both displaceable parts, whereby, upon disengagement of one clutch, the other clutch is made ready for engagement without interruption. The ratio of the relative speeds of the parts of the clutch to be engaged is therefore always the same and rejection of one half of the clutch by the other half is assured. The claws of one mating clutch half slide with their inclined surfaces along the inclined surfaces of the claws of the other clutch half into the gaps between the claws as soon as the speed of the faster rotating clutch half is reduced or that of the slower rotating half is increased to effect overtaking of one clutch half by the other.

Such clutches have been found satisfactory in innumerable applications to street and rail cars. However, if they are built in large sizes, they require relatively great forces for their actuation, not only for immediate readying of the clutch to be engaged after disengagement of the other clutch of a pair, without interruption, but also for quick insertion of the claws of the axially movable clutch part into the gaps of the counterpart at the moment when one part overtakes the other, when the friction between the claws sliding on one another must be overcome. The great forces needed and applied for actuating the clutches also increase chattering of the claws during the periods when they reject clutch engagement. Due to the relatively great masses of the axially movable halves of large clutches, the claws are worn and, in the case of very large clutches, damaged when the relative directions of rotation of the clutch halves is reversed immediately after the axial claw faces are disengaged and only a small part of the claw flanks are engaged. Though rather rare, it is a very undesirable occurrence.

It is an object of the present invention to provide a simple and practical clutch having overtaking claws, in which large claw flanks are engaged at once and which requires a small actuating force even if the clutch is large and operates at high speed. To accomplish this, locking claws are provided which rotate with one of the clutch halves. Two locking claws would be sufficient; preferably, however, a greater number is arranged in a circle. The locking claws are spring or hydraulically loaded and circumfertially movable relative to the claws of the clutch half rotating therewith and are circumferentially offset with respect to the large radial flanks of the clutch claws to the extent of less than one quarter of the circumferential spacing of the claws, when the clutch is disengaged. The locking claws, as well as the clutch claws, have face portions which are so inclined as to cause rejection of the mating clutch halves until the claws of the clutch part, which does not rotate with the locking claws, push the latter back for clearing the gaps for insertion of the claws. This occurs after the relative direction of rotation of the clutch claws is reversed.

The profiles of the clutch claws and of the locking claws may be differently designed depending on the different uses to which the clutch according to the invention is put. In the simplest design, all claws have the same shape, all clutch claws extending inwardly from the same imaginary cylinder, the claws of the clutch part rotating with the locking claws being radially shorter than the other clutch claws and the radial extension of the locking claws amounting to the difference between the radial extensions of the clutch claws of different clutch halves.

The axial faces of the locking claws and those of the clutch claws not rotating therewith are preferably provided with flat circumferentially inclined surfaces which are parallel to one another for rejecting the other clutch claws and the axial faces of the latter are provided with steeper circumferentially inclined surfaces for facilitating engagement when they are overtaken by the locking claws.

The clutch claws rotating with the locking claws need not necessarily have inclined axial face surfaces because rejection of the other clutch claws is effected by the locking claws. It is desirable, however, in many applications of the invention to provide the other claws also with circumferentially inclined axial face portions because the clutch can thereby be made axially shorter.

A portion of the axial faces of the locking claws extends preferably axially beyond the axial faces of the clutch claws rotating therewith so that, upon reversal of the relative direction of rotation of the clutch halves, the flanks of the locking claws are definitely engaged prior to those of the claws rotating with the locking claws.

In the clutch according to the invention, the flanks of the claws of the coupling half not rotating with the locking claws at first engage only the flanks of the latter if the relative direction of rotation of the clutch halves is reversed. It requires little force to push back the locking claws, and the force required for axially moving the axially movable clutch half is also small. The clutch according to the invention therefore requires little force for its actuation, and the mechanism to accomplish it is simple and inexpensive.

If reversal of relative rotation of the clutch parts occurs immediately after the counterclaws, which do not rotate with the locking claws, have left the axial faces of the locking claws and the flanks of the counterclaws engage only a small part of the flanks of the locking claws, the latter are pushed back before the clutch is engaged. The counterclaws have completed a large part of their axial movement when the flanks of the locking claws are in the same position as the flanks of the claws rotating therewith and the clutch claws of both clutch halves engage one another with large surfaces and the claws are fully pushed into the respective gaps with little effort.

The locking claws are preferably mounted on one side of an annular member which is freely rotatable in one clutch half and which is provided with abutments for one end of resilient means, such as coil springs whose other ends rest on abutments which are unrotatably connected with the clutch half in which the annular member is rotatable.

Further and other objects of the present invention will be hereinafter set forth in the accompanying specification and claims, and shown in the drawings, which, by way of illustration, show what I now consider to be preferred embodiments of my invention.

In the drawings:

Fig. 1 is a longitudinal sectional view of a claw clutch according to the invention in disengaged position;

Fig. 2 is a transverse sectional view of the clutch shown in Fig. 1, the section being taken along line C—D of Fig. 1; the lower right quarter of Fig. 2 shows a section taken along line A—B in Fig. 1;

Fig. 6 is a diagrammatic showing of the relative position of the claws of a clutch according to the invention in disengaged position;

Fig. 12 is a side view of a modified clutch according to the invention suitable for use as a free-wheeling device, in engaged position;

Fig. 13 is a side view of a portion of the clutch shown in Fig. 12, in disengaged position;

Fig. 14 is a diagrammatic showing of the claws of the clutch shown in Figs. 12 and 13 in disengaged position.

Like parts are designated by like numerals in all figures of the drawings.

Figure 3:
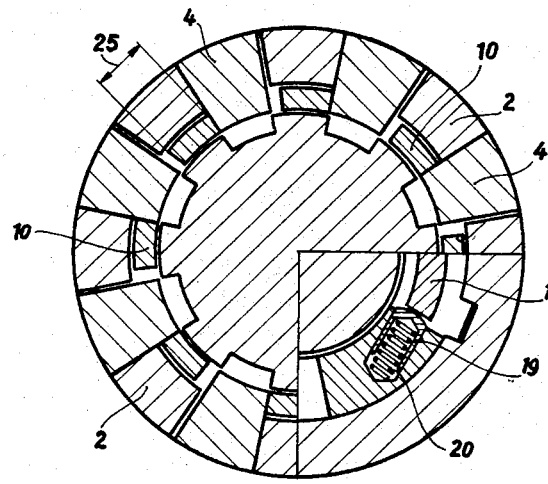
Fig. 3 is a transverse sectional view of the clutch shown in Fig. 1, in engaged position.
Figure 4:
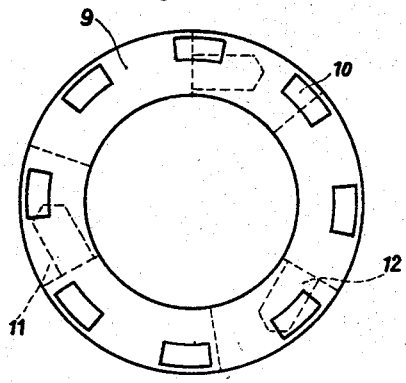
Figs. 4 and 5 are axial views of individual parts of the clutch shown in Figs. 1 to 3.
Figure 5:
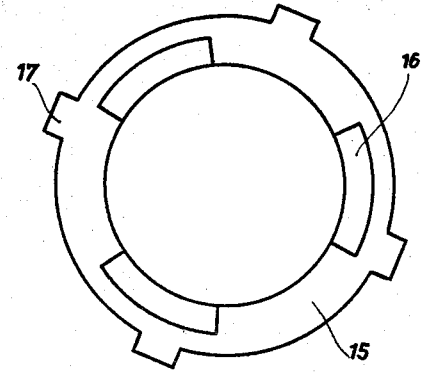

Referring more particularly to Figs. 1 to 3 of the drawings, numeral 1 designates a part of the clutch according to the invention, which part is integral with a gear wheel of a transmission as used in a motor vehicle. Part 1 has an axial face provided with claws 2 adapted to be inserted into the gap between claws 4 of the clutch sleeve 3 mating with part 1. Sleeve 3 is splined on an extension 6 of a shaft 5. A pin 7 forming an end of shaft 5 and projecting from extension 6 is borne in a ball bearing 8 fitted in part 1. An annular member 9, shown per se in Fig. 4, is rotatably disposed inside an axial bore in part 1. Locking claws 10 concentric with claws 2 of part 1 and disposed outside of the splines on extensions 6 project axially from one side of member 9. Lugs 11 project axially from the other side of member 9 and are provided with bores 12 extending from a radial end face of the lugs at a tangent to a circle which is coaxial with member 9 and extends substantially through the middle of the lugs. A second annular member 15, shown per se in Fig. 5, is also inserted in the axial bore of part 1. Member 15 has radial extensions 17 extending into corresponding axial grooves 18 in the wall of the bore in part 1 and rotates with the latter. Member 15 is further provided with three axially projecting lug portions 16 extending into the gaps between the lugs 11 on member 9. A pin 19 is axially slidable in the bores 12 of each member 9 and has a cavity for receiving one end of a coil spring 20, the other end of which rests against the bottom of bore 12. The springs 20 press pins 19 individually against a radial face on lug portions 16 resiliently spacing the latter from lugs 11. Claws 4 of sleeve 3 have internal radial face portions 21 adapted to engage the radial faces at one side of the locking claws 10. The circumferential extension of the latter is indicated at 25 and is smaller than one half of the pitch of the flanks of the clutch claws. Claws 10 extend axially beyond the faces of claws 2 by a distance 26.

The axial faces of claws 2 have circumferentially inclined portions 22 and the axial faces of claws 4 have corresponding circumferentially inclined portions 24, as seen in Fig. 6. The axial faces of the locking claws 10 comprise also circumferentially inclined portions which form the larger part of the faces, whereas the inclined surfaces on the faces of claws 2 and 4 form only a minor part of the faces. The locking claws 10 are offset with respect to the claws 2, with which they rotate, by a distance 27 when the clutch is disengaged, as seen in Fig. 2. This distance 27 is less than one quarter of the pitch of the flanks of the claw clutch. The axial faces of claws 4 of sleeve 3 are spaced from the axial faces of the locking claws 10 by a distance 28 indicated in Fig. 1.

Fig. 1 shows the clutch in fully disengaged position. For engaging the clutch, sleeve 3 must be moved to the left by the distance 28, whereupon the axial face portions 21 of claws 4 are pressed against the axial face portions of locking claws 10, as seen in Fig. 6. This is the case if the clutch parts move at the speeds indicated by the arrows in Fig. 6, i. e. claws 4 rotate faster than claws 2 and locking claws 10 which are yieldingly connected with claws 2. Under these conditions, claws 4 continually ride up on the inclined surfaces 23 of claws 10 and are rejected by the latter. If the circumferential speed of claws 4 is reduced to less than that of claws 2 and 10 or if the circumferential speed of claws 2 and 10 is increased to more than that of claws 4, the axial faces of the latter glide along the axial faces of claws 10 and thereafter along the axial faces of claws 2; if sleeve 3 continues to be pushed to the left in Fig. 1, the inclined axial face portions 24 of claws 4 slide on the inclined axial face portions 22 of claws 2; during the last mentioned movement, the large radial faces of claws 4 abut against the large radial faces of claws 10 moving the latter against the action of springs 20; the relative circumferential movement of claws 4 and 2 continues until the large radial faces of claws 10 are flush with those of claws 2; claws 4 can now be moved axially fully into the gaps between the claws 2, whereby the clutch is engaged and its parts are in the position shown in Fig. 3.

For assuring uninterrupted drive, pairs of clutches should be used in a transmission, and the axially movable parts should be connected in the conventional manner, so that if one clutch is engaged, the other clutch is disengaged without intermediate stoppage. This will also assure that the relative rotation of the parts of each clutch is correct at the moment of engagement.

Diagrams Figs. 7 to 11 illustrate various relative operating positions of modified clutch claws. Claws 32 of one clutch half, corresponding to claws 2 in Figs. 1 to 6 and rotating with locking claws 30, and claws 34 of the mating clutch half, corresponding to claws 4 in Figs. 1 to 6, have inclined surfaces 36 and 38, respectively, at their axial faces, the surfaces being parallel to one another. Additional parallel inclined surfaces 35 and 37 are interposed between the surfaces 36 and 38, respectively, and the short radial faces of claws 32 and 34, respectively, the inclination of the surfaces 35 and 37 being greater than that of the surfaces 36 and 38. Locking claws 30 have axial faces composed of portions 33, which are at a right angle to the rotation axis of the clutch, and inclined portions 31, which are parallel to the surfaces 36 and 38. Numerals 39 and 40 designate the axial face portions of claws 32 and 34, respectively, which portions are in a plane at a right angle to the rotation axis of the clutch.

As long as both clutch halves rotate at the same speed and in the same direction as indicated by arrows 41 and 42, the axial faces 40 of claws 34 continue to abut the axial face portions 33 of locking claws 30. If the circumferential speed of claws 34 is greater than that of claw 32, the former will travel to the right in Fig. 7 relatively to the latter and slide down on the large radial faces of claws 30 until the inclined face portions 38 meet the inclined face portions 36 of claws 32, whereupon surfaces 38 slide on surfaces 36. If the difference between the circumferential speeds of claws 34 and 32 is small, surface 37 will first abut surface 35 before surface 38 slides on surface 36. Continued increased speed of claws 34 relatively to claws 32 causes sliding of surface 40 on surface 39 and then sliding of surface 38 on surface 33 of claw 30. Thereupon surfaces 40 once more slide on surfaces 33 and the parts reassume the relative position shown in Fig. 7. As long as claws 34 move faster than claws 32 and 30, the clutch half with claws 34 is continually rejected by the other clutch half.

Figure 7:
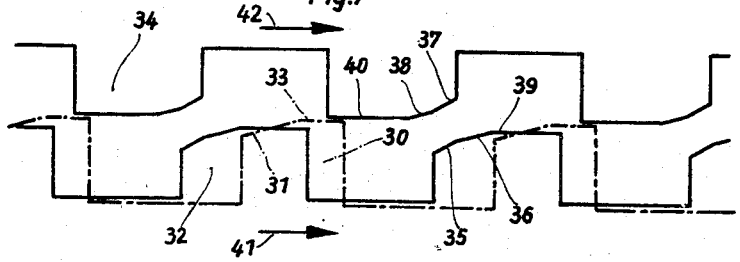
Figs. 7 to 11 illustrate diagrammatically modified claws of a clutch according to the invention in different operating positions.
Figure 8:
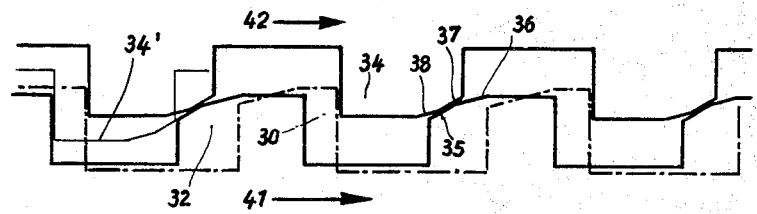
Figure 9:
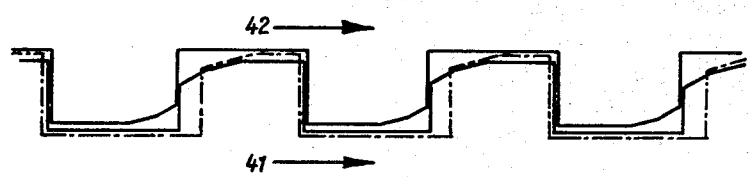

If the higher speed of claws 34 is reduced or the lower speed of claws 32 is increased until the relative direction of circumferential movement of the claws is reversed when the parts are approximately in the position shown in Fig. 7, surfaces 40 slide to the left in Fig. 7 along surfaces 33, whereupon surfaces 38 slide on surfaces 31. A portion of surfaces 40 will thereafter slide on surfaces 39, and surfaces 38 will slide on surfaces 36. Thereupon the steeper surfaces 37 slide on the steeper surfaces 35 until the large radial faces of claws 34 engage the large radial faces of locking claws 30, as shown in Fig. 8. This causes displacement of claws 30 against the action of springs 20 and movement of claws 34 into the gaps between claws 32. When claws 34 have reached the position 34' indicated by a light line in Fig. 8, the large radial faces of claws 30 are flush with the large radial faces of claws 32. Claws 34 can now reach the fully engaging position which is shown in Fig. 9.

Insertion of the claws 34 into the gaps of the counterpart of the clutch meets very little resistance after the large radial faces of claws 34 have engaged the large radial faces of claws 30, because the latter must only be pushed back and the friction between the radial claw faces is small. The friction increases slightly after the radial faces of claws 34 engage those of claws 32 (position 34' in Fig. 8). In this position, the major part of the axial movement of claws 34 is completed, and a slight axial pressure is sufficient to produce full engagement of the clutch.

Figure 10:
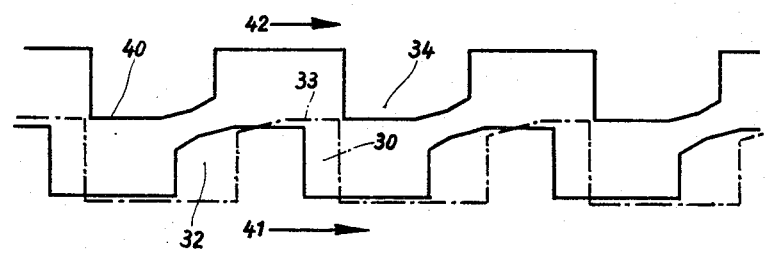
Figure 11:
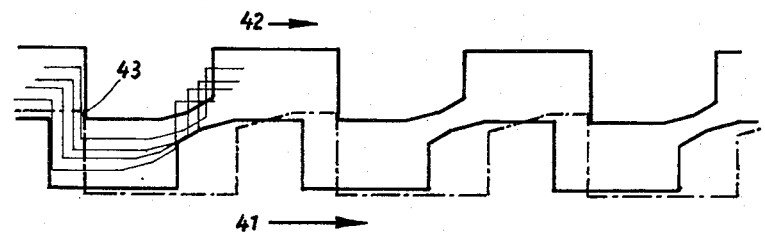

Fig. 10 illustrates the relative position of the claws after the axial face portions 40 of the claws 34 have left the axial face portions 33 of locking claws 30. If the relative rotational speed of the mating clutch parts is reversed at this moment, a small part 43 of the large radial faces of claws 34 will engage the large radial faces of locking claws 30, as shown in Fig. 11. Claws 30, however, recede immediately, and claws 34 can quickly enter the gaps of the mating clutch part, assuming consecutively the positions indicated by light lines in Fig. 11. Engagement of even very large clutches according to the invention is effected quickly and without appreciable resistance. Incomplete engagement due to great resistance is not possible with the new clutch.

The claws shown in Figs. 7 to 11 can also be used for clutches rotating in the opposite direction. Only the relative direction of rotation of the clutch halves is of consequence: If, for example, a clutch rotating in the opposite direction is in the position according to Fig. 7, claws 34 are rejected as long as there speed is slower than that of claws 31. As soon as they rotate at the same speed and the relative speed has passed through its zero value, the clutch is engaged in the manner described supra.

As a modification, the locking claws may be provided on the axially movable clutch part without changing the operating principles according to the invention.

Claws 50 of part 51 of the modified clutch illustrated in Figs. 12, 13, and 14 and claws 52 of the counterpart 53 of said clutch are so formed that they can transmit power with one radial face or flank only, namely: flank 55 of claw 50 and flank 56 of claw 52.

Claws 50 and 52 have inclined axial face portions 57 and 58, respectively. Locking claws 60 are circumferentially yieldingly connected with clutch part 51, as are claws 10 with part 1 of the clutch shown in Figs. 1 to 6, and rotate with part 51. Clutch part 53 is axially movable but not rotatable on a splined shaft. When the clutch is engaged as shown in Fig. 12, the locking claws 60 are held back by the inner portion of the flanks 56 of the clutch part 53.

If the clutch rotates in the direction of the arrow shown in Fig. 12 and the clutch part 51 advances relatively to clutch part 53, the claws slide out of engagement along the inclined surfaces 57 and 58, and clutch part 53 is pushed to the right; the locking claws 60 follow and assume the position shown in Figs. 13 and 14. Thereupon claws 52 move axially in front of claws 60 and are held out of engagement by the latter. If, thereupon, the speed of rotation of part 53 exceeds that of part 51, claws 52 move along the inclined axial face portions 57 of claws 50 into engaging position, pushing locking claws 60 circumferentially until their large flanks are flush with the large flanks of claws 50.

Engagement of clutch parts 51 and 53 may be prevented or free-wheeling blocked by holding 53 in the position shown in Fig. 13 by conventional means engaging the annular recess 61.

While I believe the above described embodiments of my invention to be preferred embodiments, I wish it to be understood that I do not desire to be limited to the exact details of design and construction shown and described, for obvious modifications will occur to a person skilled in the art.

I claim:

1. A claw clutch having two mating parts, one of said parts being axially movable relative to the other part, each part having axially projecting claws and gaps therebetween for receiving the claws of the mating part, each claw having a radial flank and an axial face, a member located coxially within and rotatably supported by one of said clutch parts and having axially projecting locking claws disposed substantially concentrically with and each having a radial flank and an axial face the latter adapted to slide on the axial faces of the claws of the clutch part by which the member is not rotatably supported, at least the claws of the clutch part with which said member is not rotatably connected having a circumferentially inclined axial face portion, and resilient means interposed between said member and the clutch part by which it is rotatably supported for urging the member, when the clutch is disengaged, into a position in which said flanks of the locking claws project circumferentially from said flanks of the claws of the clutch part by which the member is rotatably supported and into a space radially adjacent to the gaps between the claws of the clutch part by which the member is rotatably supported and for affording engagement of the clutch by rotation of said member against the pressure of said resilient means and pushing the locking claws circumferentially out of said space by engagement of said flanks of the claws of the clutch part by which the member is not rotatably supported with said flanks of the locking claws when the rotational speed of the latter exceeds that of the clutch part by which the member is not rotatably supported.

2. A claw clutch as defined in claim 1, in which, when the clutch is in disengaged position, said flanks of said locking claws urged by said resilient means into the space radially adjacent to the claw gaps project circumferentially from the flanks of the claws of the clutch part supporting said member by less than one quarter of the pitch of the flanks of the clutch claws.

3. A claw clutch as defined in claim 1, said locking claws being disposed concentrically within the claws of the clutch part by which said member is supported and having a circumferential extension which is less than that of the claws within which they are concentrically disposed.

4. A claw clutch having two mating parts, one of said parts being axially movable relatively to the other part, each part having a plurality of axially protruding claws and gaps therebetween for receiving the claws of the mating part when the clutch is engaged, each claw having a large radial flank surface and an axial face portion adjacent to said large flank surface and disposed in a plane at a right angle to the rotation of the clutch, each claw having an axial face portion which is circumferentially inclined with respect to the face portion which is in a plane at a right angle to the rotation axis of the clutch, the inclined face portions of the claws of one clutch part being inclined in the same direction as the inclined face portions of the claws of the mating part for facilitating running of the claws of one part on and off the claws of the mating part, a member disposed coaxially within and rotatably supported by one of said clutch parts and having axially projecting locking claws disposed substantially concentrically with the claws of the clutch part by which the member is rotatably supported, each locking claw having a large radial flank and an axial face portion circumferentially inclined with respect to a plane at a right angle to the rotation axis of the clutch and in the same direction as the inclined axial face portions of the claws of said mating parts, and resilient means interposed between said member and the clutch part by which it is rotatably supported for resiliently urging the member, when the clutch is disengaged, into a position in which the large flanks of the locking claws project circumferentially from the large flanks of the claws and into a space radially adjacent to the gaps between the claws of the clutch part by which the member is rotatably supported and for affording engagement of the clutch by rotation of said member against the pressure of said resilient means and pushing the locking claws circumferentially out of said space by engagement of the large flanks of the claws of the clutch part by which the member is not rotatably supported with the large flanks of the locking claws when the rotational speed of the latter exceeds that of the clutch part by which the member is not rotatably supported.

5. A claw clutch as defined in claim 4, the inclined axial face portions of the claws of at least one clutch part having at least two surfaces of different inclination.

6. A claw clutch as defined in claim 4, the inclined axial face portions of the claws of each of said clutch parts having at least two surfaces of different inclination, the inclination of one of the surfaces of the claws of one part being substantially parallel to one of the surfaces of the claws of the other clutch part and the other surfaces of the first claws being substantially parallel to the other surfaces of the other clutch part.

7. A claw clutch having two mating parts, one of said parts being axially movable relative to the other part, each part having axially projecting claws and gaps therebetween for receiving the claws of the mating part, each claw having a radial flank and an axial face, an annular member disposed coaxially and rotatably supported by one of said clutch parts, said member having locking claws projecting axially from one side of the member and being disposed substantially concentrically with and each having a radial flank and an axial face adapted to slide on the axial faces of the claws of the clutch part by which the member is not rotatably supported, said member having lugs projecting axially from its other side and having a radial flank, a longitudinal cavity in each of said lugs extending thereinto from their radial flanks in a direction substantially at a right angle to the flank of the respective lug, a coil spring inserted in each of said cavities and having a portion projecting therefrom, and abutments connected with the clutch part by which said annular member is rotatably supported and extending between said lugs, the projecting portions of said springs individually abutting said abutments for urging said member, when the clutch is disengaged, into a position in which said flanks of the locking claws project circumferentially from said flanks of, and into the spaces radially adjacent to the gaps between, the claws of the clutch part by which the member is rotatably supported and for affording engagement of the clutch by rotation of said member against the action of said springs and pushing the locking claws circumferentially out of said space by engagement of said flanks of the claws of the clutch part by which said member is not rotatably supported with said flanks of the locking claws when the rotational speed of the latter exceeds that of the clutch part by which said member is not rotatably supported, at least the claws of the clutch part by which said member is not rotatably supported having a circumferentially inclined axial face portion for facilitating running of the claws on and off the claws of the mating clutch part.

8. A claw clutch having two mating parts, one of said parts being axially movable relative to the other part, each part having axially projecting and circumferentially spaced claws, the circumferential extension of the claws being greater than that of the spaces between the claws, each claw having a radial flank, the radial flanks of the claws of one mating part being adapted to be individually axially slidably engaged by the flanks of the claws of the other mating part, each claw having an axial face having a surface portion in a plane at a right angle to the rotation axis of the clutch and a circumferentially inclined surface portion receding from said first surface portion, the inclined portions of the claws of one mating part conforming with and slidably engaging the inclined surface portions of the claws of the other mating part for axially separating and disengaging the mating parts when the relative rotational speeds of said parts tend to circumferentially separate said radial flanks of the claws of one clutch part from those of the other clutch part, an annular member placed coaxially within and rotatably supported by one of said clutch parts and having axially projecting locking claws disposed substantially concentrically with and having each a radial flank and resilient means interposed between said member and the clutch part by which it is rotatably supported for urging said member, when the clutch is disengaged, into a position in which said flanks of the locking claws project circumferentially from said flanks of, and into the spaces radially adjacent to the gaps between, the claws of the clutch part by which the member is rotatably supported and for affording engagement of the clutch by rotation of said member against the action of said resilient means and pushing the locking claws circumferentially out of said space by engagement of said flanks of the claws of the clutch part by which said member is not rotatably supported with said flanks of the locking claws when the rotational speed of the latter exceeds that of the clutch part by which said member is not rotatably supported.

9. A claw clutch comprising a first part, a counterpart mating said first part, one of said parts being axially movable relative to the other part, said first part having clutch claws having flanks, a member disposed coaxially within and rotatably supported by said first part and having axially projecting locking claws disposed substantially concentrically of the claws of said first part, said locking claws having flanks projecting circumferentially beyond the flanks of the clutch claws of the first part when the clutch is in disengaged position, and resilient means interposed between said first part and said member for urging the latter into the position in which the flanks of its claws project beyond the flanks of the claws of the first part, said counterpart having counterclaws mating said locking claws, said locking claws and said counterclaws having axial face portions sliding on one another when the clutch is disengaged and the two clutch parts rotate at different speeds, preventing engagement of the clutch, said counterclaws having flanks adapted to axially slidably engage the flanks of said locking claws and to rotate said member relatively to said first part against the action of said resilient means upon reversal of relative movement of said clutch parts, for circumferentially pushing the flanks of the locking claws to be flush with the flanks of the clutch claws of the first part and affording engagement of the clutch.

10. A claw clutch as defined in claim 1, said locking claws having a portion projecting axially beyond the claws of the clutch part by which said member is rotatably supported, and said resilient means connecting said member and affording rotation of said member with the clutch part by which it is supported.

GUSTAV MEYER.

References Cited in the file of this patent

UNITED STATES PATENTS

| Number | Name | Date |
|---|---|---|
| 1,836,773 | Salerni | Dec. 15, 1931 |
| 2,049,126 | Maybach | July 28, 1936 |
| 2,180,597 | Le Bus | Nov. 21, 1939 |
| 2,257,006 | Hall | Sept. 23, 1941 |

FOREIGN PATENTS

| Number | Country | Date |
|---|---|---|
| 285,891 | Germany | July 16, 1915 |
| 418,328 | Great Britain | Oct. 23, 1934 |